United States Patent
Zhang et al.

(10) Patent No.: US 9,584,007 B2
(45) Date of Patent: Feb. 28, 2017

(54) CURRENT SOURCE CONVERTER DIFFERENTIAL PROTECTION METHOD AND RELAY PROTECTION DEVICE

(71) Applicants: NR ELECTRIC CO., LTD., Jiangsu (CN); NR ENGINEERING CO., LTD., Jiangsu (CN)

(72) Inventors: Qixue Zhang, Jiangsu (CN); Jun Chen, Jiangsu (CN); Wei Yan, Jiangsu (CN); Xiangjian Shi, Jiangsu (CN); Guang Wang, Jiangsu (CN); Wei Yan, Jiangsu (CN); Weiqun Liu, Jiangsu (CN); Quanrong Shen, Jiangsu (CN)

(73) Assignees: NR ELECTRIC CO., LTD. (CN); NR ENGINEERING CO., LTD. (CN)

( * ) Notice: Subject to any disclaimer, the term of this patent is extended or adjusted under 35 U.S.C. 154(b) by 0 days.

(21) Appl. No.: 14/894,944

(22) PCT Filed: Apr. 14, 2014

(86) PCT No.: PCT/CN2014/075267
§ 371 (c)(1),
(2) Date: Nov. 30, 2015

(87) PCT Pub. No.: WO2014/190814
PCT Pub. Date: Dec. 4, 2014

(65) Prior Publication Data
US 2016/0118877 A1 Apr. 28, 2016

(30) Foreign Application Priority Data
May 30, 2013 (CN) .......................... 2013 1 0210288

(51) Int. Cl.
*H02M 1/32* (2007.01)
*H02H 3/30* (2006.01)
(Continued)

(52) U.S. Cl.
CPC ............... *H02M 1/32* (2013.01); *H02H 3/305* (2013.01); *H02H 3/307* (2013.01); *H02H 7/1216* (2013.01); *H02M 7/04* (2013.01)

(58) Field of Classification Search
CPC ...... H02M 1/32; H02M 5/458; H02M 5/4585; H02M 7/04
See application file for complete search history.

(56) References Cited

U.S. PATENT DOCUMENTS

| 4,295,175 | A * | 10/1981 | Cordray | ................. | H02H 3/307 361/64 |
| 2004/0004794 | A1* | 1/2004 | Kang | ..................... | H02H 7/045 361/38 |

(Continued)

FOREIGN PATENT DOCUMENTS

| CA | 2071397 | 3/1993 |
| CN | 1474489 | 2/2004 |
| CN | 101764394 | 6/2010 |

OTHER PUBLICATIONS

International Search Report from corresponding application No. PCT/CN2014/075267.

*Primary Examiner* — Timothy J Dole
*Assistant Examiner* — Yusef Ahmed
(74) *Attorney, Agent, or Firm* — Hauptman Ham, LLP (57) ABSTRACT

Embodiments of the present invention disclose a current source converter differential protection method, including: sampling, by a relay protection device, secondary side currents of current transformers on two sides of a protected current source converter, to obtain incomer-side three-phase currents, and outgoer-side three-phase currents; rectifying the incomer-side three-phase currents and the outgoer-side three-phase currents, to obtain an incomer-side input current and an outgoer-side output current which are equivalent; converting the incomer-side input current and the outgoer-side output current according to a current ratio of the current transformers on the two sides, to acquire a transient differ- (Continued)

ential current and a transient restraint current; acquiring a differential current and a restraint current according to the transient differential current and the transient restraint current; and achieving differential protection according to the differential current and the restraint current. The embodiments of the present invention further disclose a relay protection device correspondingly.

17 Claims, 7 Drawing Sheets

(51) Int. Cl.
    *H02H 7/12*         (2006.01)
    *H02M 7/04*         (2006.01)

(56) References Cited

U.S. PATENT DOCUMENTS

| | | | | |
|---|---|---|---|---|
| 2004/0041535 A1* | 3/2004 | Toyoda | ............... | H02P 25/024 318/700 |
| 2008/0130179 A1* | 6/2008 | Gajic | ............... | H02H 7/045 361/36 |
| 2008/0130183 A1* | 6/2008 | Kawashima | .......... | H02M 5/458 361/79 |
| 2013/0182466 A1* | 7/2013 | Lu | ............... | H02J 3/386 363/34 |
| 2014/0002937 A1* | 1/2014 | Tausa | ............... | H02H 3/343 361/76 |
| 2014/0021937 A1* | 1/2014 | Wang | ............... | H02M 5/02 323/361 |
| 2014/0211528 A1* | 7/2014 | Inoue | ............... | H02M 7/797 363/123 |
| 2014/0265596 A1* | 9/2014 | Yuan | ............... | H02J 3/382 307/69 |
| 2015/0103573 A1* | 4/2015 | Zhu | ............... | H02M 1/36 363/131 |
| 2015/0255978 A1* | 9/2015 | Chen | ............... | H02H 7/045 361/36 |
| 2015/0349511 A1* | 12/2015 | Kojovic | ............... | G01R 15/181 361/36 |

* cited by examiner

CURRENT SOURCE CONVERTER DIFFERENTIAL PROTECTION METHOD AND RELAY PROTECTION DEVICE

FIELD OF THE INVENTION

Embodiments of the present invention relate to the field of power and electron technologies, and in particular to a current source converter differential protection method and a relay protection device.

DESCRIPTION OF RELATED ART

For high-power power electronic converters (sometimes called inverters), according to types of output waveforms, converters having independent controllable topology of output voltage waveforms are called voltage source converter or voltage source inverter (VSC or VSI); similarly, converters having independent controllable topology of output current waveforms are called current source converter or current source inverter (CSC or CSI).

Regarding the discussion about this aspect, reference can be made to Chapter 14 of Power Electronics Handbook ([US] mainly complied by Muhammad H. Rashid, translated by Chen Jianye et al., China Machine Press, 2004).

Large-capacity CSCs are widely applied to power systems, for example, three-phase full bridge controlled rectifiers of large generator self-shunt excitation systems, pumping mode starting devices of large pumped-storage units, i.e., static frequency converters (SFCs), large gas turbine generator starting devices, i.e., Load Commutated Inverters (LCIs), and converters used by some large traction devices.

For the large-capacity CSC devices, a relay protection method for reliably and rapidly judging an internal short circuit fault is often required. A ratio restraint characteristic differential protection method (reference can be made to RELAY PROTECTION PRINCIPLE AND APPLICATION OF MAIN ELECTRICAL EQUIPMENT ($2^{nd}$ Edition) complied by Professor Wang Weijian Tsinghua University, China Electric Power Press, 2002) is a method for judging an internal short circuit fault in power devices widely applied to power systems, which not only has high protection reliability and rapid movement speed, but also can distinguish whether a short circuit fault occurs inside (called internal fault) or outside (called external fault). An incomer side and an outgoer side of a protected device are respectively mounted with a protection-level current transformer (CT), and the past differential protection method needs to measure and calculate power frequency currents of CTs on two sides. However, for the CSC devices applied in the power systems, it is common that an alternating current at a power frequency is input from the incomer side (grid side) and an alternating current at a frequency ranging greatly is output from the other outgoer side, and the past differential protection method cannot be directly applied to occasions where current frequencies on the two sides are different.

At present, relay protection methods mostly used by the large-capacity CSC devices are: overcurrent protection, overload protection, asymmetrical three phase current protection, current change rate $$\left(\frac{di}{dt}\right)$$

protection, and so on. The protection methods, compared with differential protection, have an advantage that protection action time is relatively longer. In addition, the protection methods cannot distinguish whether a short circuit fault occurs inside or outside.

SUMMARY OF THE INVENTION

Technical Problem

An objective of the embodiments of the present invention is to provide a current source converter differential protection method and a relay protection device, to solve the problem that the existing differential protection method cannot be applied to current source converters.

Technical Solution

The technical solution adopted by the embodiments of the present invention is:

A current source converter differential protection method, including:

sampling, by a relay protection device, secondary side currents of current transformers on two sides of a protected current source converter, to obtain incomer-side three-phase currents $i_{Na}$, $i_{Nb}$ and $i_{Nc}$, and outgoer-side three-phase currents $i_{Ma}$, $i_{Mb}$ and $i_{Mc}$;

rectifying the incomer-side three-phase currents and the outgoer-side three-phase currents, to obtain an incomer-side input current $i_N$ and an outgoer-side output current $i_M$ which are equivalent;

converting the incomer-side input current and the outgoer-side output current according to a current ratio of the current transformers on the two sides, to acquire a transient differential current $i_{diff}$ and a transient restraint current $i_{res}$;

acquiring a differential current $i_{diff}$ and a restraint current $I_{res}$ according to the transient differential current and the transient restraint current; and achieving differential protection according to the differential current $i_{diff}$ and the restraint current $I_{res}$.

Preferably, the rectifying the incomer-side three-phase currents and the outgoer-side three-phase currents, to obtain an incomer-side input current $i_N$ and an outgoer-side output current $i_M$ which are equivalent includes:

using hardware rectification, and using a hardware three-phase rectifier bridge inside the relay protection device, to obtain the rectified incomer-side input current $i_N$ and outgoer-side output current $i_M$ which are equivalent.

Preferably, the rectifying the incomer-side three-phase currents and the outgoer-side three-phase currents, to obtain an incomer-side input current $i_N$ and an outgoer-side output current $i_M$ which are equivalent includes:

using digital rectification, to obtain an incomer-side input current and an outgoer-side output current which are equivalent according to $$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \text{and}$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases}, \text{where}$$

$$i_{kj+}(n) = \begin{cases} i_{kj}(n), & \text{if } i_{kj}(n) \geq 0 \\ 0, & \text{if } i_{kj}(n) < 0 \end{cases}$$

$$j = a, b, c; k = N, M;$$

-continued $$i_{kj-}(n) = \begin{cases} 0, & \text{if } i_{kj}(n) > 0 \\ |i_{kj}(n)|, & \text{if } i_{kj}(n) \leq 0 \end{cases}$$

$$j = a, b, c; k = N, M.$$

Preferably, the rectifying the incomer-side three-phase currents and the outgoer-side three-phase currents, to obtain an incomer-side input current $i_N$ and an outgoer-side output current $i_M$ which are equivalent includes:

obtaining an incomer-side input current and an outgoer-side output current which are equivalent according to $$i_N(n) = \frac{|i_{Na}(n)| + |i_{Nb}(n)| + |i_{Nc}(n)|}{2} \text{ and}$$

$$i_M(n) = \frac{|i_{Ma}(n)| + |i_{Mb}(n)| + |i_{Mc}(n)|}{2},$$

wherein the sign n indicates a sampling sequence number.

Preferably, the rectifying the incomer-side three-phase currents and the outgoer-side three-phase currents, to obtain an incomer-side input current $i_N$ and an outgoer-side output current $i_M$ which are equivalent includes:

acquiring the transient differential current according to $$\begin{cases} i_{diff+}(n) = K_1 i_{N+}(n) - K_2 i_{M+}(n) \\ i_{diff-}(n) = K_1 i_{N-}(n) - K_2 i_{M-}(n), \\ i_{diff}(n) = K_1 i_N(n) - K_2 i_M(n) \end{cases}$$

and
acquiring the transient restraint current according to $$\begin{cases} i_{res+}(n) = \frac{K_1 i_{N+}(n) - K_2 i_{M+}(n)}{2} \\ i_{res-}(n) = \frac{K_1 i_{N-}(n) - K_2 i_{M-}(n)}{2}, \\ i_{res}(n) = \frac{K_1 i_N(n) - K_2 i_M(n)}{2} \end{cases}$$

wherein n indicates a sampling sequence number, K1 and K2 are current reduction coefficients, and when $n_{CT,M} \leq n_{CT,N}$, $$\begin{cases} K_1 = 1 \\ K_2 = n_{CT,M}/n_{CT,N} \end{cases};$$

and when $n_{CT,M} < n_{CT,N}$, $$\begin{cases} K_1 = n_{CT,N}/n_{CT,M} \\ K_2 = 1 \end{cases}.$$

Preferably, the acquiring a differential current $i_{diff}$ and a restraint current $I_{res}$ according to the transient differential current and the transient restraint current includes:
according to $$\begin{cases} I_{diff+}(n) = \left| \frac{1}{W} \sum_{k=n-(W-1)}^{n} i_{diff+}(k) \right| \\ I_{diff-}(n) = \left| \frac{1}{W} \sum_{k=n-(W-1)}^{n} i_{diff-}(k) \right| \text{ and} \\ I_{diff}(n) = \left| \frac{1}{W} \sum_{k=n-(W-1)}^{n} i_{diff}(k) \right| \end{cases}$$

$$\begin{cases} I_{res+}(n) = \frac{1}{W} \sum_{k=n-(W-1)}^{n} i_{res+}(k) \\ I_{res-}(n) = \frac{1}{W} \sum_{k=n-(W-1)}^{n} i_{res-}(k), \\ I_{res}(n) = \frac{1}{W} \sum_{k=n-(W-1)}^{n} i_{res}(k) \end{cases}$$

performing arithmetic mean functional transformation to obtain the differential current $i_{diff}$ and the restraint current $I_{res}$, wherein n or k indicates a sampling sequence number, and w is a data window length.

Preferably, the acquiring a differential current $i_{diff}$ and a restraint current $I_{res}$ according to the transient differential current and the transient restraint current includes:
according to $$\begin{cases} I_{diff+}(n) = \sqrt{\frac{1}{W} \sum_{k=n-(W-1)}^{n} i_{diff+}^2(k)} \\ I_{diff-}(n) = \sqrt{\frac{1}{W} \sum_{k=n-(W-1)}^{n} i_{diff-}^2(k)} \text{ and} \\ I_{diff}(n) = \sqrt{\frac{1}{W} \sum_{k=n-(W-1)}^{n} i_{diff}^2(k)} \end{cases}$$

$$\begin{cases} I_{res-}(n) = \sqrt{\frac{1}{W} \sum_{k=n-(W-1)}^{n} i_{res+}^2(k)} \\ I_{res-}(n) = \sqrt{\frac{1}{W} \sum_{k=n-(W-1)}^{n} i_{res-}^2(k)}, \\ I_{res}(n) = \sqrt{\frac{1}{W} \sum_{k=n-(W-1)}^{n} i_{res}^2(k)} \end{cases}$$

performing root-mean-square functional transformation to obtain the differential current $i_{diff}$ and the restraint current, wherein n or k indicates a sampling sequence number, and w is a data window length.

Preferably, the achieving differential protection according to the differential current $i_{diff}$ and the restraint current $I_{res}$ includes:
achieving differential protection according to the differential current and the restraint current based on line ratio restraint characteristics or variable-slope ratio restraint characteristics.

Preferably, $I_{diff+}$ and $I_{res+}$ make up a group of differential current and restraint current, $I_{diff-}$ and $I_{res-}$ make up a group of differential current and restraint current, and $I_{diff}$ and $I_{res}$ make up a group of differential current and restraint current.

A relay protection device, including: a sampling unit, a rectifier unit, a first acquisition unit, a second acquisition unit and a differential protection unit; wherein the sampling unit is configured to sample secondary side currents of current transformers on two sides of a protected current source converter, to obtain incomer-side three-phase currents $i_{Na}$, $i_{Nb}$ and $i_{Nc}$, and outgoer-side three-phase currents $i_{Ma}$, $i_{Mb}$ and $i_{Mc}$;

the rectifier unit is configured to rectify the incomer-side three-phase currents and the outgoer-side three-phase currents, to obtain an incomer-side input current $i_A$r and an outgoer-side output current M which are equivalent;

the first acquisition unit is configured to convert the incomer-side input current and the outgoer-side output current according to a current ratio of the current transformers on the two sides, to acquire a transient differential current $i_{diff}$ and a transient restraint current $i_{res}$;

the second acquisition unit is configured to acquire a differential current $i_{diff}$ and a restraint current $I_{res}$ according to the transient differential current and the transient restraint current; and the differential protection unit is configured to achieve differential protection according to the differential current $i_{diff}$ and the restraint current $I_{res}$.

Preferably, the rectifier unit is configured to:
use hardware rectification, and use a hardware three-phase rectifier bridge inside the relay protection device, to obtain the rectified incomer-side input current $i_N$ and outgoer-side output current $i_M$ which are equivalent.

Preferably, the rectifier unit is configured to:
use digital rectification, to obtain an incomer-side input current and an outgoer-side output current which are equivalent according to $$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \text{ and}$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases}, \text{ wherein}$$

$$i_{kj+}(n) = \begin{cases} i_{kj}(n), & \text{if } i_{kj}(n) \geq 0 \\ 0, & \text{if } i_{kj}(n) < 0 \end{cases}$$

$$j = a, b, c; k = N, M;$$

$$i_{kj-}(n) = \begin{cases} 0, & \text{if } i_{kj}(n) > 0 \\ |i_{kj}(n)|, & \text{if } i_{kj}(n) \leq 0 \end{cases}$$

$$j = a, b, c; k = N, M.$$

Preferably, the rectifier unit is configured to:
obtain an incomer-side input current and an outgoer-side output current which are equivalent according to $$i_N(n) = \frac{|i_{Na}(n)| + |i_{Nb}(n)| + |i_{Nc}(n)|}{2} \text{ and}$$

$$i_M(n) = \frac{|i_{Ma}(n)| + |i_{Mb}(n)| + |i_{Mc}(n)|}{2},$$

wherein the sign n indicates a sampling sequence number.

Preferably, the first acquisition unit is configured to:
acquire the transient differential current according to $$\begin{cases} i_{diff+}(n) = K_1 i_{N-}(n) - K_2 i_{M+}(n) \\ i_{diff-}(n) = K_1 i_{N-}(n) - K_2 i_{M-}(n) \\ i_{diff}(n) = K_1 i_N(n) - K_2 i_M(n) \end{cases},$$

and
acquire the transient restraint current according to $$\begin{cases} i_{res+}(n) = \frac{K_1 i_{N-}(n) + K_2 i_{M+}(n)}{2} \\ i_{res-}(n) = \frac{K_1 i_{N-}(n) + K_2 i_{M-}(n)}{2} \\ i_{res}(n) = \frac{K_1 i_N(n) + K_2 i_M(n)}{2} \end{cases},$$

wherein n indicates a sampling sequence number, K1 and K2 are current reduction coefficients, and when $n_{CT,M} \geq n_{CT,N}$ $$\begin{cases} K_1 = 1 \\ K_2 = n_{CT,M}/n_{CT,N} \end{cases};$$

and when $n_{CT,M} < n_{CT,N}$, $$\begin{cases} K_1 = n_{CT,N}/n_{CT,M} \\ K_2 = 1 \end{cases}.$$

Preferably, the second acquisition unit is configured to:
according to $$\begin{cases} I_{diff+}(n) = \left| \frac{1}{W} \sum_{k=n-(W-1)}^{n} i_{diff+}(k) \right| \\ I_{diff-}(n) = \left| \frac{1}{W} \sum_{k=n-(W-1)}^{n} i_{diff-}(k) \right| \\ I_{diff}(n) = \left| \frac{1}{W} \sum_{k=n-(W-1)}^{n} i_{diff}(k) \right| \end{cases}$$

and $$\begin{cases} I_{res+}(n) = \frac{1}{W} \sum_{k=n-(W-1)}^{n} i_{res+}(k) \\ I_{res-}(n) = \frac{1}{W} \sum_{k=n-(W-1)}^{n} i_{res-}(k) \\ I_{res}(n) = \frac{1}{W} \sum_{k=n-(W-1)}^{n} i_{res}(k) \end{cases},$$

perform arithmetic mean functional transformation to obtain the differential current $i_{diff}$ and the restraint current $I_{res}$, wherein n or k indicates a sampling sequence number, and w is a data window length.

Preferably, the second acquisition unit is configured to:
according to $$\begin{cases} I_{diff+}(n) = \sqrt{\frac{1}{W} \sum_{k=n-(W-1)}^{n} i^2_{diff+}(k)} \\ I_{diff-}(n) = \sqrt{\frac{1}{W} \sum_{k=n-(W-1)}^{n} i^2_{diff-}(k)} \\ I_{diff}(n) = \sqrt{\frac{1}{W} \sum_{k=n-(W-1)}^{n} i^2_{diff}(k)} \end{cases}$$

-continued and $$\begin{cases} I_{res+}(n) = \sqrt{\frac{1}{W}\sum_{k=n-(W-1)}^{n} i_{res+}^2(k)} \\ I_{res-}(n) = \sqrt{\frac{1}{W}\sum_{k=n-(W-1)}^{n} i_{res-}^2(k)} \, , \\ I_{res}(n) = \sqrt{\frac{1}{W}\sum_{k=n-(W-1)}^{n} i_{res}^2(k)} \end{cases}$$

perform root-mean-square functional transformation to obtain the differential current $i_{diff}$ and the restraint current, wherein n or k indicates a sampling sequence number, and w is a data window length.

Preferably, the differential protection unit is configured to: achieve differential protection according to the differential current and the restraint current based on line ratio restraint characteristics or variable-slope ratio restraint characteristics.

Advantageous Effect

Beneficial effects of the embodiments of the present invention are as follows: the problem that the past current converters cannot achieve differential protection as current frequencies on two sides are different is solved, the problem that relay protection of the past current converters cannot distinguish an internal fault from an external fault is solved, and a rapid relay protection method is provided for the current converters, wherein the method has simple secondary circuit connections, facilitates protection setting calculation, and is easy to use.

DETAILED DESCRIPTION OF THE INVENTION

To clearly describe the method of the present invention, specific implementation manners of the present invention are stated herein by taking a SFC of a certain 50 MW pumped storage unit as an example.

Figure 1:
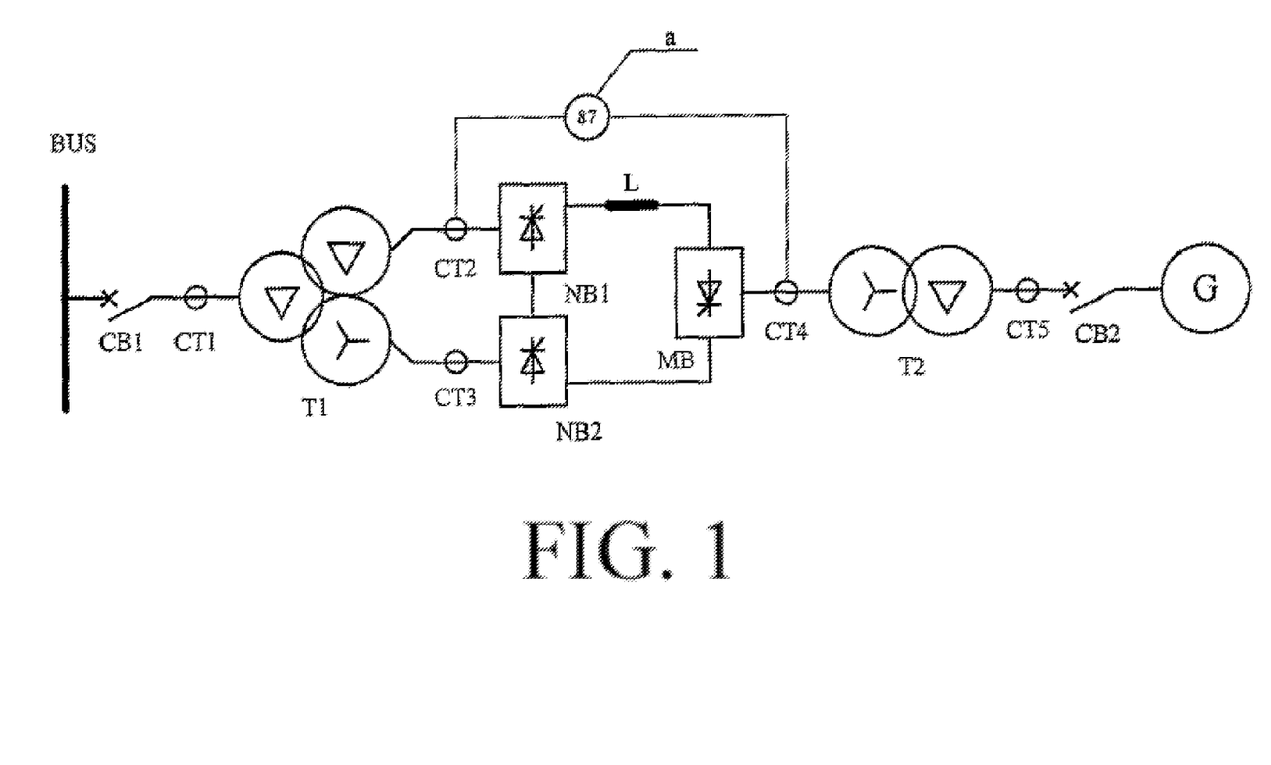
FIG. 1 is a schematic view of one current converter differential protection connection according to an embodiment of the present invention.
Figure 2:
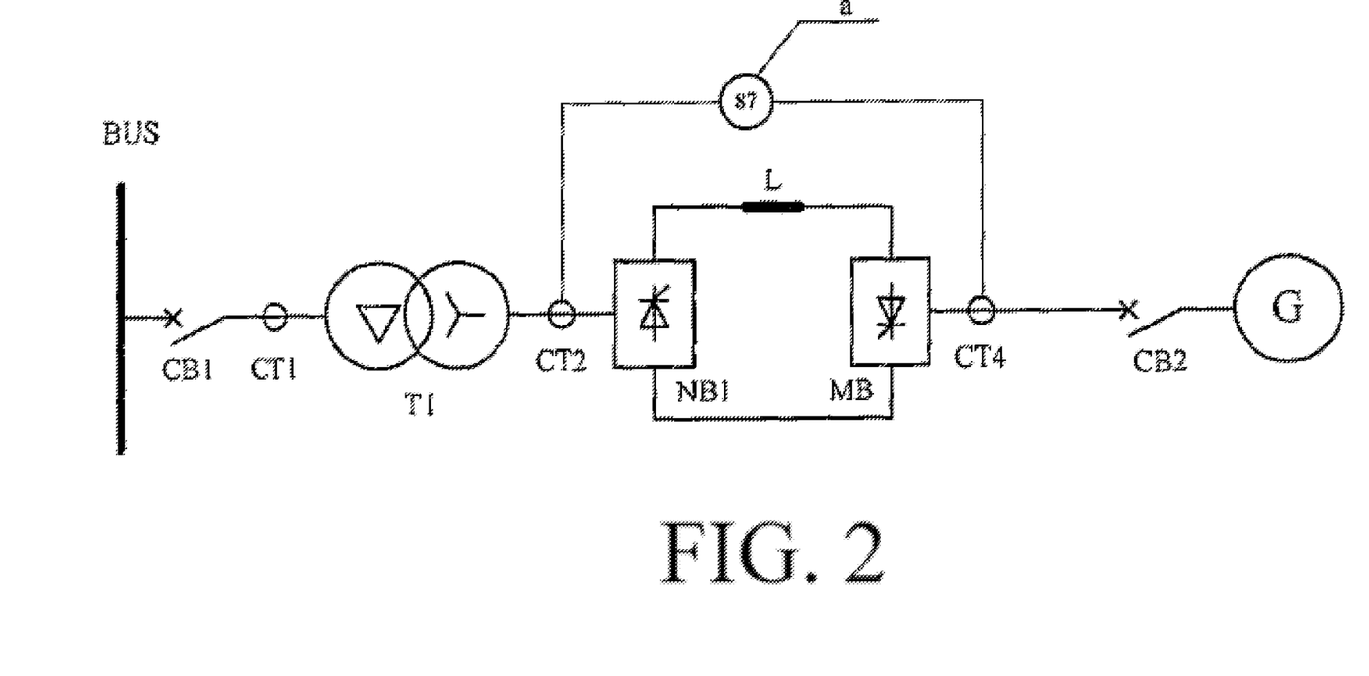
FIG. 2 is a schematic view of another current converter differential protection connection according to an embodiment of the present invention.

The BUS in FIG. 1 is a grid incomer-side bus, CB1 is an incomer-side circuit breaker, CB2 is an outgoer-side circuit breaker, T1 is an incomer-side isolation transformer, T2 is an outgoer-side isolation transformer, NB1 and NB2 are incomer-side rectifier bridges (called network bridges), MB is an outgoer-side inverter bridge (called machine bridge), L is a converter DC reactor, G is a generator motor, CT1-CT5 are three-phase current transformers, and a in the figure indicates a relay protection device. FIG. 2 is different from FIG. 1 in that there is no outgoer-side isolation transformer and there is only one group of incomer-side rectifier bridges. FIG. 1 is a schematic view of a common SFC connection, and FIG. 2 is a common LCI connection.

Figure 3:
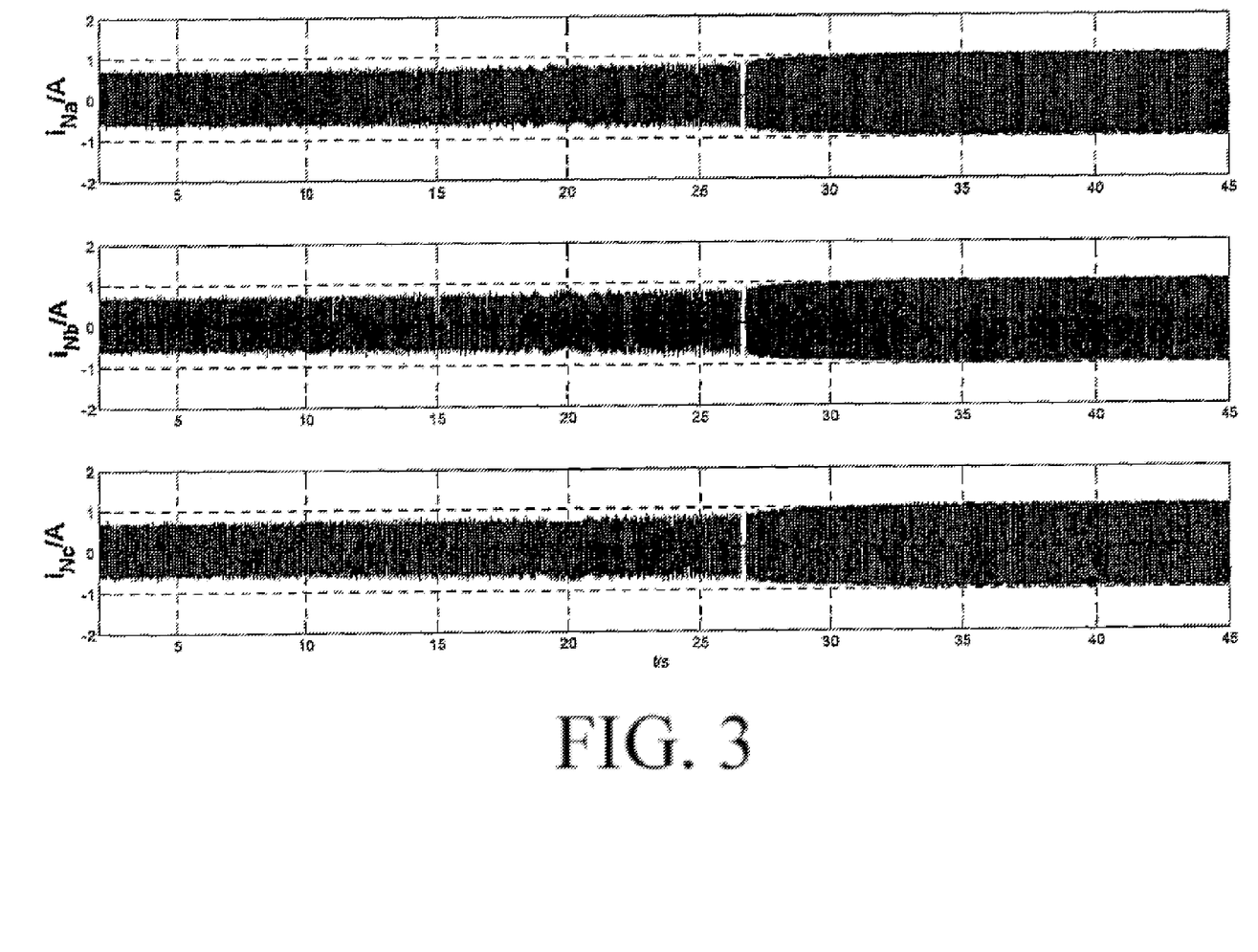
FIG. 3 is an incomer-side three-phase current waveform actually measured of a certain example of current converter differential protection according to an embodiment of the present invention.

FIG. 3 shows an incomer-side three-phase current waveform actually measured by a converter in a certain variable frequency starting process, $i_{Na}$ is a-phase current, $i_{Nb}$ is b-phase current, and $i_{Nc}$ is c-phase current.

Figure 4:
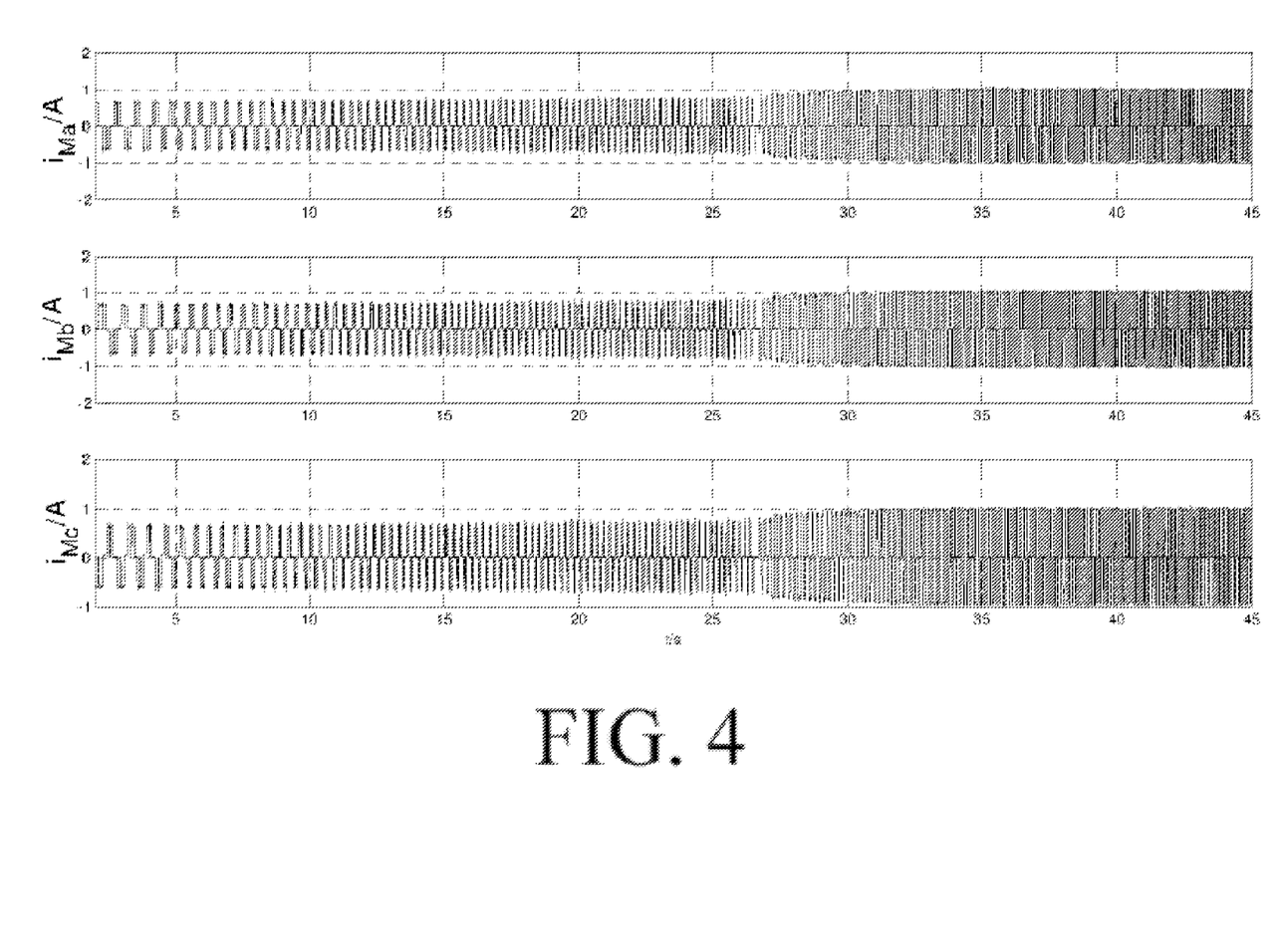
FIG. 4 is an outgoer-side three-phase current waveform actually measured of a certain example of current converter differential protection according to an embodiment of the present invention.

FIG. 4 shows an incomer-side three-phase current waveform actually measured by a converter in a certain variable frequency starting process, $i_{Ma}$ is a-phase current, $i_{Mb}$ is a b-phase current, and $i_{Mc}$ is c-phase current.

Figure 5:
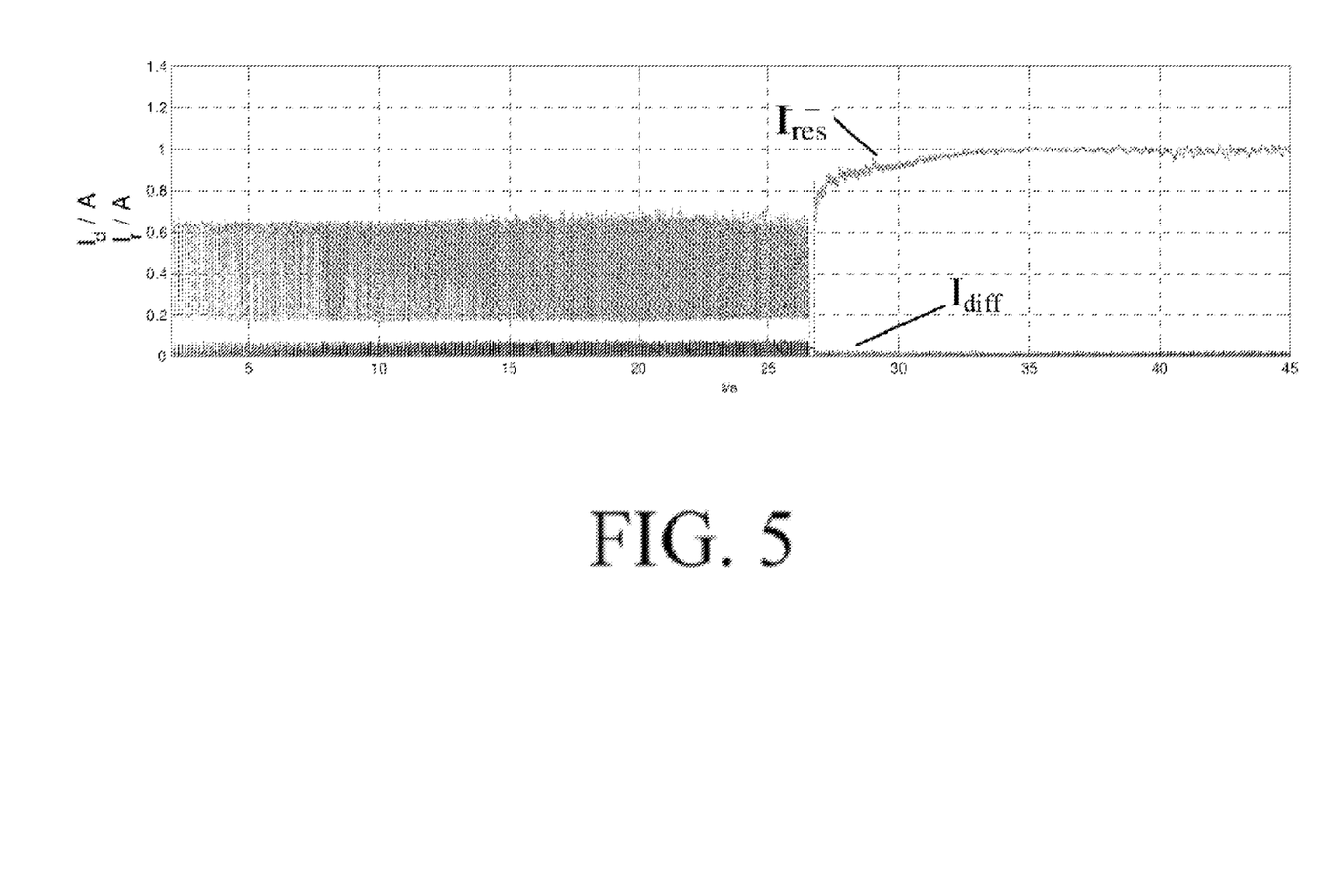
FIG. 5 is a differential current and a restraint current calculated in a certain example of current converter differential protection according to an embodiment of the present invention.

FIG. 5 shows calculation results for data in FIG. 3 and FIG. 4, wherein $I_{diff}$ and $I_{res}$ are a differential current and a restraint current obtained through calculation according to Formula 9 in the embodiments of the present invention.

Figure 6:
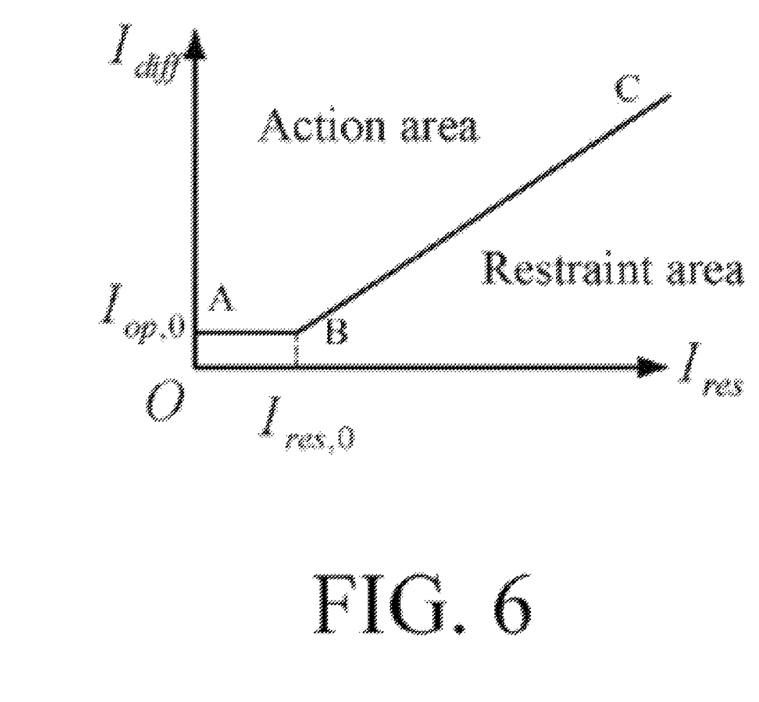
FIG. 6 is a schematic view of a two-line ratio restraint characteristic diagram of current converter differential protection according to an embodiment of the present invention.

In FIG. 6, the abscissa $I_{res}$ is the restraint current, the ordinate $I_{diff}$ is the differential current, a two-line ratio restraint characteristic curve ABC, above the curve is a differential protection action area, below the curve is a differential protection restraint area, $I_{op,O}$ is a differential current value corresponding to a starting point A, and $I_{res,0}$ is a restraint current value corresponding to an inflection point B.

Figure 7:
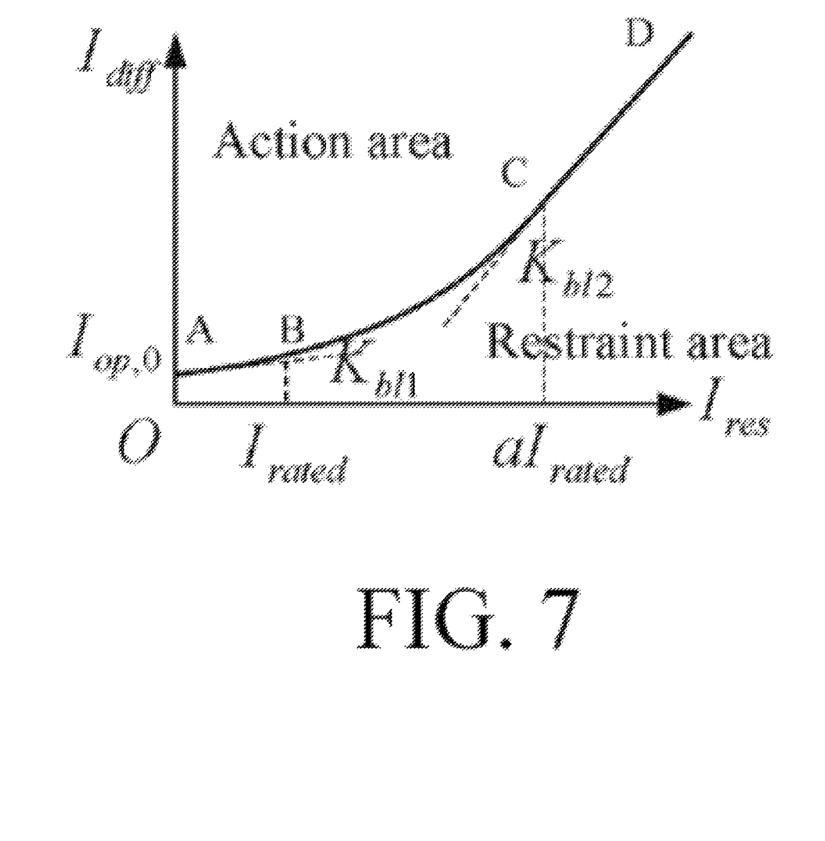
FIG. 7 is a schematic view of a variable-slope ratio restraint characteristic diagram of current converter differential protection according to an embodiment of the present invention.

In FIG. 7, the abscissa $I_{res}$ is the restraint current, the ordinate $i_{diff}$ is the differential current, a variable-slope ratio restraint characteristic curve ABCD, above the curve is a differential protection action area, below the curve is a differential protection restraint area, $I_{op,0}$ is a differential current value corresponding to a starting point A, $K_{bl1}$ is a starting ratio differential slope (the slope of the curve at A point), $I_{rated}$ is a rated current of the protected device (which has been converted to a CT secondary value), a is a restraint current multiple in the case of a maximum ratio restraint coefficient, $K_{bl2}$ is a maximum ratio differential slope (the slope of the curve at C point), and a CD segment is a line segment.

For example, rated power of a pumped storage generator motor is 50 MW, a rated voltage is 10.5 kV, and a rated power factor is 0.85. A configured SFC is as shown in FIG. 1, an incomer-side bus voltage is 10.5 kV, an incomer transformer T1 is a three-loop transformer with capacity of 4 MVA, a voltage ratio is 10.5 kV/0.7 kV/0.7 kV, and a transformer connection manner is Dd0y1; two rectifier bridges NB1 and NB2 are cascaded on the SFC incomer side, and current ratios of AC-side three-phase current transformers CT2 and CT3 of the rectifier bridges are both 2000 A/1 A; one inverter bridge MB is on the SFC outgoer side, and a current ratio of an AC-side three-phase current transformer CT4 of the inverter bridge is 2000 A/1 A; after output of the inverter bridge, a two-loop transformer T2 with capacity of 4 MVA is connected, a voltage ratio is 1.4 kV/10.5 kV, a transformer connection manner is Yd1, and after output of the transformer, the generator motor G is connected.

Herein, currents on two sides of the SFC, by taking an incomer-side current measured by CT2 and an output-side current measured by CT4 as an example, can achieve differential protection according to the method of the embodiments of the present invention. Similarly, an incomer-side current measured by CT3 and an output-side current measured by CT4 can also achieve differential protection.

Specific steps of the embodiments of the present invention are as follows:

(1) Current Sampling

A relay protection device samples a secondary side current of a current transformer CT2, to obtain a incomer-side three-phase current (CT current secondary value) data sequence $i_{Na}(n)$, $i_{Nb}(n)$ and $i_{Nc}(n)$; the relay protection device samples a secondary side current of a current transformer CT4, to obtain an outgoer-side three-phase current (CT current secondary value) data sequence $i_{Ma}(n)$, $i_{Mb}(n)$ and $i_{Mc}(n)$. The sign n indicates a sampling sequence number, the subscripts Na, Nb and Nc indicate incomer-side (grid-side) a phase, b phase and c phase, the subscripts Ma, Mb and Mc indicate outgoer-side a phase, b phase and c phase. W is the length of a sampling data window, and in the domestic relay protection device, W is generally set as 24.

FIG. 3 shows an incomer-side three-phase current waveform actually measured in a variable frequency starting process of the pumped-storage unit SFC. FIG. 4 shows an outgoer-side three-phase current waveform actually measured in a variable frequency starting process of the pumped-storage unit SFC. In the variable frequency starting process, the frequency of the incomer-side three-phase current is kept at a power frequency 50 Hz, while the frequency of the outgoer-side three-phase current ranges greatly from low to high and gradually rises to 50 Hz. In the variable frequency starting process, the former stage is a phase commutation process, in which the current is discontinuous, and the latter stage is a load commutation process, in which the current is continuous.

(2) Rectify

It should be noted that there are two rectification methods: (I) Hardware rectification, that is, a hardware three-phase rectifier bridge is used inside the relay protection device, to obtain the rectified incomer-side input current $i_N$ and outgoer-side output current $i_M$ which are equivalent; and (II) Software rectification, also called digital rectification, that is, first values of the incomer-side three-phase current and the outgoer-side three-phase current are obtained through sampling, and then through a calculation method, an incomer-side input current $i_N$ and an outgoer-side output current $i_M$ which are equivalent are obtained.

In the embodiments of the present invention, digital rectification is respectively performed on the incomer-side (grid-side) three-phase current and the outgoer-side three-phase current. Through the rectification method, a data sequence is obtained according to the following Formula 1 and Formula 2:

$$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \quad \text{Formula 1}$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases} \quad \text{Formula 2}$$

wherein, $$i_{kj+}(n) = \begin{cases} i_{kj}(n), & \text{if } i_{kj}(n) \geq 0 \\ 0, & \text{if } i_{kj}(n) < 0 \end{cases} \quad \text{Formula 3}$$

$j = a, b, c;$
$k = N, M$ $$i_{kj-}(n) = \begin{cases} 0, & \text{if } i_{kj}(n) > 0 \\ |i_{kj}(n)|, & \text{if } i_{kj}(n) \leq 0 \end{cases} \quad \text{Formula 4}$$

$j = a, b, c;$
$k = N, M$ or the digital rectification is performed according to Formula 1' and Formula 2', to obtain:

$$i_N(n) = \frac{|i_{Na}(n)| + |i_{Nb}(n)| + |i_{Nc}(n)|}{2} \quad \text{Formula 1'}$$

$$i_M(n) = \frac{|i_{Ma}(n)| + |i_{Mb}(n)| + |i_{Mc}(n)|}{2} \quad \text{Formula 2'}$$

After the digital rectification, two side currents are converted to fluctuant DCs. When there is no short circuit fault inside the SFC, a DC flowing into the SFC is approximately equal to that flowing out of the SFC, and when there is a short circuit fault inside the SFC, inflow and outflow are not equal, and an evident differential current will be generated.

It should be noted that in the embodiments of the present invention, + indicates a direction in which a current flows out from an upper bridge arm of a rectifier bridge, and − indicates a direction in which the current flows back from a lower bridge arm of the rectifier bridge.

(3) Calculate a transient differential current and a transient restraint current A difference of the equivalent two side currents is calculated, to obtain a transient differential current through calculation according to Formula 5; the equivalent two side currents are averaged, to obtain a transient restraint current through calculation according to Formula 6.

$$\begin{cases} i_{diff+}(n) = K_1 i_{N+}(n) - K_2 i_{M+}(n) \\ i_{diff-}(n) = K_1 i_{N-}(n) - K_2 i_{M-}(n) \\ i_{diff}(n) = K_1 i_N(n) - K_2 i_M(n) \end{cases} \quad \text{Formula 5}$$

$$\begin{cases} i_{res+}(n) = \frac{K_1 i_{N+}(n) + K_2 i_{M+}(n)}{2} \\ i_{res-}(n) = \frac{K_1 i_{N-}(n) + K_2 i_{M-}(n)}{2} \\ i_{res}(n) = \frac{K_1 i_N(n) + K_2 i_M(n)}{2} \end{cases} \quad \text{Formula 6}$$

K1 and K2 in Formula 5 and Formula 6 are current reduction coefficients, and are related to incomer-side and outgoer-side CT current ratios. Generally, reduction is made to the side where the CT ratio is less. The incomer-side CT current ratio is $n_{CT,N}$=2000 A/1 A, and the outgoer-side CT current ratio is $n_{CT,M}$=2000 A/1 A. Referring to Formula 7 above, the current reduction coefficient is: $K_1 = K_2 = 1$.

(4) Calculate a differential current and a restraint current

There are two methods for calculating a differential current and a restraint current.

Method 1: arithmetic method. The differential current and the restraint current are:

$$\begin{cases} I_{diff+}(n) = \left| \dfrac{1}{W} \sum_{k=n-(W-1)}^{n} i_{diff+}(k) \right| \\ I_{diff-}(n) = \left| \dfrac{1}{W} \sum_{k=n-(W-1)}^{n} i_{diff-}(k) \right|, \\ I_{diff}(n) = \left| \dfrac{1}{W} \sum_{k=n-(W-1)}^{n} i_{diff}(k) \right| \end{cases} \quad \text{Formula 9}$$

$$\begin{cases} I_{res+}(n) = \dfrac{1}{W} \sum_{k=n-(W-1)}^{n} i_{res+}(k) \\ I_{res-}(n) = \dfrac{1}{W} \sum_{k=n-(W-1)}^{n} i_{res-}(k) \\ I_{res}(n) = \dfrac{1}{W} \sum_{k=n-(W-1)}^{n} i_{res}(k) \end{cases}$$

Method 2: root-mean-square algorithm. The differential current and the restraint current are:

$$\begin{cases} I_{diff+}(n) = \sqrt{\dfrac{1}{W} \sum_{k=n-(W-1)}^{n} i^2_{diff+}(k)} \\ I_{diff-}(n) = \sqrt{\dfrac{1}{W} \sum_{k=n-(W-1)}^{n} i^2_{diff-}(k)}, \\ I_{diff}(n) = \sqrt{\dfrac{1}{W} \sum_{k=n-(W-1)}^{n} i^2_{diff}(k)} \end{cases} \quad \text{Formula 10}$$

$$\begin{cases} I_{res-}(n) = \sqrt{\dfrac{1}{W} \sum_{k=n-(W-1)}^{n} i^2_{res+}(k)} \\ I_{res-}(n) = \sqrt{\dfrac{1}{W} \sum_{k=n-(W-1)}^{n} i^2_{res-}(k)} \\ I_{res}(n) = \sqrt{\dfrac{1}{W} \sum_{k=n-(W-1)}^{n} i^2_{res}(k)} \end{cases}$$

In Formula 9 and Formula 10, W is a data window length, which can be set as 0.5-1.0 times the number of sampling points within one power frequency cycle. When W is the number of sampling points within one power frequency cycle, it is called a full data window; when W is less than the number of sampling points within one power frequency cycle, it is called a short data window. When the short data window is used, an action speed of the differential protection can be accelerated. Generally, the number of sampling points within one power frequency cycle of the relay protection device is 24, and at this point, the value of W can be within a range of 12-24.

Whether Formula 9 or Formula 10 is used for calculation, $I_{diff+}$ and $I_{res+}$ make up a group of differential current and restraint current, and differential protection can be achieved according to conventional line ratio restraint characteristics (e.g., as shown in FIG. 6) or variable-slope ratio restraint characteristics (e.g., as shown in FIG. 7). Similarly, $I_{diff-}$ and $I_{res-}$ make up a group of differential current and restraint current, and $I_{diff}$ and $I_{res}$ also can make up a group of differential current and restraint current.

FIG. 5 shows a result of calculation according to Formula 9 of the embodiments of the present invention. It can be seen that when the pumped storage unit SFC has no fault, the differential current calculated in the embodiments of the present invention is very small, the restraint current is relatively great, and the differential protection can make no action reliably.

For a differential fixed value setting method, reference can be made to DL/T684-2012 LARGE GENERATOR TRANSFORMER RELAY PROTECTION SETTING CALCULATION GUIDE RULE or POWER PLANT RELAY PROTECTION SETTING CALCULATION AND OPERATION TECHNOLOGY (compiled by Xu Zhengya, China WaterPower Press, 2009).

The embodiments of the present invention further correspondingly put forward a relay protection device, wherein the device includes: a sampling unit, a rectifier unit, a first acquisition unit, a second acquisition unit and a differential protection unit; wherein the sampling unit is configured to sample secondary side currents of current transformers on two sides of a protected current source converter, to obtain incomer-side three-phase currents $i_{Na}$, $i_{Nb}$ and $i_{Nc}$, and outgoer-side three-phase currents $i_{Ma}$, $i_{Mb}$ and $i_{Mc}$;

the rectifier unit is configured to rectify the incomer-side three-phase currents and the outgoer-side three-phase currents, to obtain an incomer-side input current $i_N$ and an outgoer-side output current $i_M$ which are equivalent;

the first acquisition unit is configured to convert the incomer-side input current and the outgoer-side output current according to a current ratio of the current transformers on the two sides, to acquire a transient differential current $i_{diff}$ and a transient restraint current $i_{res}$;

the second acquisition unit is configured to acquire a differential current $i_{diff}$ and a restraint current $I_{res}$ according to the transient differential current and the transient restraint current; and the differential protection unit is configured to achieve differential protection according to the differential current $i_{diff}$ and the restraint current $I_{res}$.

Optionally, the rectifier unit is configured to:

obtain an incomer-side input current and an outgoer-side output current which are equivalent according to $$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \text{ and}$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases},$$

wherein $$i_{kj+}(n) = \begin{cases} i_{kj}(n), & \text{if } i_{kj}(n) \geq 0 \\ 0, & \text{if } i_{kj}(n) < 0 \end{cases}$$

$$j = a, b, c; k = N, M;$$

-continued $$i_{kj-}(n) = \begin{cases} 0, & \text{if } i_{kj}(n) > 0 \\ |i_{kj}(n)|, & \text{if } i_{kj}(n) \leq 0 \end{cases}$$

$$j = a, b, c; k = N, M.$$

Optionally, the rectifier unit is configured to:
obtain an incomer-side input current and an outgoer-side output current which are equivalent according to $$i_N(n) = \frac{|i_{Na}(n)| + |i_{Nb}(n)| + |i_{Nc}(n)|}{2} \text{ and}$$

$$i_M(n) = \frac{|i_{Ma}(n)| + |i_{Mb}(n)| + |i_{Mc}(n)|}{2},$$

wherein the sign n indicates a sampling sequence number.

Optionally, the first acquisition unit is configured to:
acquire the transient differential current according to $$\begin{cases} i_{diff+}(n) = K_1 i_{N-}(n) - K_2 i_{M+}(n) \\ i_{diff-}(n) = K_1 i_{N-}(n) - K_2 i_{M-}(n) \\ i_{diff}(n) = K_1 i_N(n) - K_2 i_M(n) \end{cases}$$

and
acquire the transient restraint current according to $$\begin{cases} i_{res|}(n) = \frac{K_1 i_{N-}(n) + K_2 i_{M+}(n)}{2} \\ i_{res-}(n) = \frac{K_1 i_{N-}(n) + K_2 i_{M-}(n)}{2} \\ i_{res}(n) = \frac{K_1 i_N(n) + K_2 i_M(n)}{2} \end{cases}$$

wherein n indicates a sampling sequence number, K1 and K2 are current reduction coefficients, and when $n_{CT,M} \geq n_{CT,N}$, $$\begin{cases} K_1 = 1 \\ K_2 = n_{CT,M}/n_{CT,N} \end{cases};$$

and when $n_{CT,M} < n_{CT,N}$, $$\begin{cases} K_1 = n_{CT,N}/n_{CT,M} \\ K_2 = 1 \end{cases}.$$

Optionally, the second acquisition unit is configured to:
according to $$\begin{cases} I_{diff+}(n) = \left| \frac{1}{W} \sum_{k=n-(W-1)}^{n} i_{diff+}(k) \right| \\ I_{diff-}(n) = \left| \frac{1}{W} \sum_{k=n-(W-1)}^{n} i_{diff-}(k) \right| \\ I_{diff}(n) = \left| \frac{1}{W} \sum_{k=n-(W-1)}^{n} i_{diff}(k) \right| \end{cases}$$

and $$\begin{cases} I_{res+}(n) = \frac{1}{W} \sum_{k=n-(W-1)}^{n} i_{res+}(k) \\ I_{res-}(n) = \frac{1}{W} \sum_{k=n-(W-1)}^{n} i_{res-}(k) \\ I_{res}(n) = \frac{1}{W} \sum_{k=n-(W-1)}^{n} i_{res}(k) \end{cases},$$

perform arithmetic mean functional transformation to obtain the differential current $i_{diff}$ and the restraint current $I_{res}$, wherein n or k indicates a sampling sequence number, and w is a data window length.

Optionally, the second acquisition unit is configured to:
according to $$\begin{cases} I_{diff+}(n) = \sqrt{\frac{1}{W} \sum_{k=n-(W-1)}^{n} i_{diff+}^2(k)} \\ I_{diff-}(n) = \sqrt{\frac{1}{W} \sum_{k=n-(W-1)}^{n} i_{diff-}^2(k)} \\ I_{diff}(n) = \sqrt{\frac{1}{W} \sum_{k=n-(W-1)}^{n} i_{diff}^2(k)} \end{cases}$$

and $$\begin{cases} I_{res-}(n) = \sqrt{\frac{1}{W} \sum_{k=n-(W-1)}^{n} i_{res+}^2(k)} \\ I_{res-}(n) = \sqrt{\frac{1}{W} \sum_{k=n-(W-1)}^{n} i_{res-}^2(k)} \\ I_{res}(n) = \sqrt{\frac{1}{W} \sum_{k=n-(W-1)}^{n} i_{res}^2(k)} \end{cases},$$

perform root-mean-square functional transformation to obtain the differential current $i_{diff}$ and the restraint current, wherein n or k indicates a sampling sequence number, and w is a data window length.

Optionally, the differential protection unit is configured to:
achieve differential protection according to the differential current and the restraint current based on line ratio restraint characteristics or variable-slope ratio restraint characteristics.

The above embodiments merely describe the technical thought of the present invention, but cannot be used to limit the protection scope of the present invention; any equivalent replacement or variation made on the basis of the technical solution according to the technical thought put forward in the present invention does not go beyond the protection scope of the present invention.

What is claimed is:
1. A current source converter differential protection method, wherein the method comprises:
sampling, by a relay protection device, secondary side currents of current transformers on two sides of a protected current source converter, to obtain incomer-side three-phase currents $i_{Na}$, $i_{Nb}$ and $i_{Nc}$, and outgoer-side three-phase currents $i_{Ma}$, $i_{Mb}$ and $i_{Mc}$;

rectifying the incomer-side three-phase currents and the outgoer-side three-phase currents, to obtain an incomer-side input current $i_N$ and an outgoer-side output current $i_M$ which are equivalent;

converting the incomer-side input current and the outgoer-side output current according to a current ratio of the current transformers on the two sides, to acquire a transient differential current $i_{diff}$ and a transient restraint current $i_{res}$;

acquiring a differential current $i_{diff}$ and a restraint current $I_{res}$ according to the transient differential current and the transient restraint current; and achieving differential protection according to the differential current $i_{diff}$ and the restraint current $I_{res}$.

2. The current source converter differential protection method according to claim 1, wherein the rectifying the incomer-side three-phase currents and the outgoer-side three-phase currents, to obtain an incomer-side input current $i_N$ and an outgoer-side output current $i_M$ which are equivalent comprises:

using hardware rectification, and using a hardware three-phase rectifier bridge inside the relay protection device, to obtain the rectified incomer-side input current $i_N$ and outgoer-side output current $i_M$ which are equivalent.

3. The current source converter differential protection method according to claim 1, wherein the acquiring a differential current $i_{diff}$ and a restraint current $I_{res}$ according to the transient differential current and the transient restraint current comprises:

acquiring the transient differential current according to $$\begin{cases} i_{diff+}(n) = K_1 i_{N+}(n) - K_2 i_{M+}(n) \\ i_{diff-}(n) = K_1 i_{N-}(n) - K_2 i_{M-}(n) \\ i_{diff}(n) = K_1 i_N(n) - K_2 i_M(n) \end{cases}$$

and
acquiring the transient restraint current according to $$\begin{cases} i_{res+}(n) = \dfrac{K_1 i_{N+}(n) + K_2 i_{M+}(n)}{2} \\ i_{res-}(n) = \dfrac{K_1 i_{N-}(n) + K_2 i_{M-}(n)}{2} \\ i_{res}(n) = \dfrac{K_1 i_N(n) + K_2 i_M(n)}{2} \end{cases},$$

wherein n indicates a sampling sequence number, K1 and K2 are current reduction coefficients, and when $n_{CT,M} \geq n_{CT,N}$, $$\begin{cases} K_1 = 1 \\ K_2 = n_{CT,M}/n_{CT,N} \end{cases};$$

and
when $n_{CT,M} < n_{CT,N}$, $$\begin{cases} K_1 = n_{CT,N}/n_{CT,M} \\ K_2 = 1 \end{cases}$$

wherein $n_{CT,N}$ is an incomer-side current transformer current ratio and $n_{CT,M}$ is an outgoer-side current transformer current ratio.

4. The current source converter differential protection method according to claim 1, wherein the acquiring a differential current $i_{diff}$ and a restraint current $I_{res}$ according to the transient differential current and the transient restraint current comprises:

according to $$\begin{cases} I_{diff+}(n) = \left|\dfrac{1}{W}\sum_{k=n-(W-1)}^{n} i_{diff+}(k)\right| \\ I_{diff-}(n) = \left|\dfrac{1}{W}\sum_{k=n-(W-1)}^{n} i_{diff-}(k)\right| \\ I_{diff}(n) = \left|\dfrac{1}{W}\sum_{k=n-(W-1)}^{n} i_{diff}(k)\right| \end{cases} \text{ and } \begin{cases} I_{res+}(n) = \dfrac{1}{W}\sum_{k=n-(W-1)}^{n} i_{res+}(k) \\ I_{res-}(n) = \dfrac{1}{W}\sum_{k=n-(W-1)}^{n} i_{res-}(k) \\ I_{res}(n) = \dfrac{1}{W}\sum_{k=n-(W-1)}^{n} i_{res}(k) \end{cases},$$

performing arithmetic mean functional transformation to obtain the differential current $i_{diff}$ and the restraint current $I_{res}$, wherein n or k indicates a sampling sequence number, and w is a data window length.

5. The current source converter differential protection method according to claim 4, wherein $I_{diff+}$ and $I_{res+}$ make up a group of differential current and restraint current, $I_{diff-}$ and $I_{res-}$ make up a group of differential current and restraint current, and $I_{diff}$ and $I_{res}$ make up a group of differential current and restraint current.

6. The current source converter differential protection method according to claim 1, wherein the acquiring a differential current $i_{diff}$ and a restraint current $I_{res}$ according to the transient differential current and the transient restraint current comprises:

according to $$\begin{cases} I_{diff+}(n) = \sqrt{\dfrac{1}{W}\sum_{k=n-(W-1)}^{n} i^2_{diff+}(k)} \\ I_{diff-}(n) = \sqrt{\dfrac{1}{W}\sum_{k=n-(W-1)}^{n} i^2_{diff-}(k)} \\ I_{diff}(n) = \sqrt{\dfrac{1}{W}\sum_{k=n-(W-1)}^{n} i^2_{diff}(k)} \end{cases} \text{ and }$$

$$\begin{cases} I_{res+}(n) = \sqrt{\dfrac{1}{W}\sum_{k=n-(W-1)}^{n} i^2_{res+}(k)} \\ I_{res-}(n) = \sqrt{\dfrac{1}{W}\sum_{k=n-(W-1)}^{n} i^2_{res-}(k)} \\ I_{res}(n) = \sqrt{\dfrac{1}{W}\sum_{k=n-(W-1)}^{n} i^2_{res}(k)} \end{cases},$$

performing root-mean-square functional transformation to obtain the differential current $i_{diff}$ and the restraint current, wherein n or k indicates a sampling sequence number, and w is a data window length.

7. The current source converter differential protection method according to claim 1, wherein the achieving differential protection according to the differential current $i_{diff}$ and the restraint current $I_{res}$ comprises:

achieving differential protection according to the differential current and the restraint current based on line ratio restraint characteristics or variable-slope ratio restraint characteristics.

8. The current source converter differential protection method according to claim 1, wherein the rectifying the incomer-side three-phase currents and the outgoer-side three-phase currents, to obtain an incomer-side input current $i_N$ and an outgoer-side output current $i_M$ which are equivalent comprises:

using digital rectification, to obtain an incomer-side input current and an outgoer-side output current which are equivalent according to $$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \text{ and}$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases},$$

wherein $$i_{kj+}(n) = \begin{cases} i_{kj}(n), & \text{if } i_{kj}(n) \geq 0 \\ 0, & \text{if } i_{kj}(n) < 0 \end{cases}$$

$$j = a, b, c; k = N, M;$$

$$i_{kj-}(n) = \begin{cases} 0, & \text{if } i_{kj}(n) > 0 \\ |i_{kj}(n)|, & \text{if } i_{kj}(n) \leq 0 \end{cases}$$

$$j = a, b, c; k = N, M,$$

and
the sign n indicates a sampling sequence number.

9. The current source converter differential protection method according to claim 1, wherein the rectifying the incomer-side three-phase currents and the outgoer-side three-phase currents, to obtain an incomer-side input current $i_N$ and an outgoer-side output current $i_M$ which are equivalent comprises:

obtaining an incomer-side input current and an outgoer-side output current which are equivalent according to $$i_N(n) = \frac{|i_{Na}(n)| + |i_{Nb}(n)| + |i_{Nc}(n)|}{2} \text{ and}$$

$$i_M(n) = \frac{|i_{Ma}(n)| + |i_{Mb}(n)| + |i_{Mc}(n)|}{2},$$

wherein the sign n indicates a sampling sequence number.

10. A relay protection device, wherein the device comprises: a sampling unit, a rectifier unit, a first acquisition unit, a second acquisition unit and a differential protection unit; wherein the sampling unit is configured to sample secondary side currents of current transformers on two sides of a protected current source converter, to obtain incomer-side three-phase currents $i_{Na}$, $i_{Nb}$ and $i_{Nc}$, and outgoer-side three-phase currents $i_{Ma}$, $i_{Mb}$ and $i_{Mc}$;

the rectifier unit is configured to rectify the incomer-side three-phase currents and the outgoer-side three-phase currents, to obtain an incomer-side input current $i_N$ and an outgoer-side output current $i_M$ which are equivalent;

the first acquisition unit is configured to convert the incomer-side input current and the outgoer-side output current according to a current ratio of the current transformers on the two sides, to acquire a transient differential current $i_{diff}$ and a transient restraint current $i_{res}$;

the second acquisition unit is configured to acquire a differential current $i_{diff}$ and a restraint current $I_{res}$ according to the transient differential current and the transient restraint current; and the differential protection unit is configured to achieve differential protection according to the differential current $i_{diff}$ and the restraint current $I_{res}$.

11. The relay protection device according to claim 10, wherein the rectifier unit is configured to:

use hardware rectification, and use a hardware three-phase rectifier bridge inside the relay protection device, to obtain the rectified incomer-side input current $i_N$ and outgoer-side output current $i_M$ which are equivalent.

12. The relay protection device according to claim 10, wherein the rectifier unit is configured to:

obtain an incomer-side input current and an outgoer-side output current which are equivalent according to $$i_N(n) = \frac{|i_{Na}(n)| + |i_{Nb}(n)| + |i_{Nc}(n)|}{2} \text{ and}$$

$$i_M(n) = \frac{|i_{Ma}(n)| + |i_{Mb}(n)| + |i_{Mc}(n)|}{2},$$

wherein the sign n indicates a sampling sequence number.

13. The relay protection device according to claim 10, wherein the first acquisition unit is configured to:

acquire the transient differential current according to $$\begin{cases} i_{diff+}(n) = K_1 i_{N+}(n) - K_2 i_{M+}(n) \\ i_{diff-}(n) = K_1 i_{N-}(n) - K_2 i_{M-}(n) , \\ i_{diff}(n) = K_1 i_N(n) - K_2 i_M(n) \end{cases}$$

and
acquire the transient restraint current according to $$\begin{cases} i_{res+}(n) = \frac{K_1 i_{N+}(n) + K_2 i_{M+}(n)}{2} \\ i_{res-}(n) = \frac{K_1 i_{N-}(n) + K_2 i_{M-}(n)}{2} , \\ i_{res}(n) = \frac{K_1 i_N(n) + K_2 i_M(n)}{2} \end{cases}$$

wherein n indicates a sampling sequence number, K1 and K2 are current reduction coefficients, and
when $N_{CT,M} \geq n_{CT,N}$, $$\begin{cases} K_1 = 1 \\ K_2 = n_{CT,M} / n_{CT,N} \end{cases};$$

and
when $n_{CT,M} < n_{CT,N}$, $$\begin{cases} K_1 = n_{CT,N} / n_{CT,M} \\ K_2 = 1 \end{cases}$$

wherein $n_{CT,N}$ is an incomer-side current transformer current ratio and $n_{CT,M}$ is an outgoer-side current transformer current ratio.

14. The relay protection device according to claim 10, wherein the second acquisition unit is configured to:
according to $$\begin{cases} I_{diff+}(n) = \left| \dfrac{1}{W} \sum_{k=n-(W-1)}^{n} i_{diff+}(k) \right| \\ I_{diff-}(n) = \left| \dfrac{1}{W} \sum_{k=n-(W-1)}^{n} i_{diff-}(k) \right| \\ I_{diff}(n) = \left| \dfrac{1}{W} \sum_{k=n-(W-1)}^{n} i_{diff}(k) \right| \end{cases} \text{ and } \begin{cases} I_{res+}(n) = \dfrac{1}{W} \sum_{k=n-(W-1)}^{n} i_{res+}(k) \\ I_{res-}(n) = \dfrac{1}{W} \sum_{k=n-(W-1)}^{n} i_{res-}(k) \\ I_{res}(n) = \dfrac{1}{W} \sum_{k=n-(W-1)}^{n} i_{res}(k) \end{cases},$$

perform arithmetic mean functional transformation to obtain the differential current $i_{diff}$ and the restraint current $I_{res}$, wherein n or k indicates a sampling sequence number, and w is a data window length.

15. The relay protection device according to claim 10, wherein the second acquisition unit is configured to:
according to $$\begin{cases} I_{diff+}(n) = \sqrt{\dfrac{1}{W} \sum_{k=n-(W-1)}^{n} i^2_{diff+}(k)} \\ I_{diff-}(n) = \sqrt{\dfrac{1}{W} \sum_{k=n-(W-1)}^{n} i^2_{diff-}(k)} \\ I_{diff}(n) = \sqrt{\dfrac{1}{W} \sum_{k=n-(W-1)}^{n} i^2_{diff}(k)} \end{cases} \text{ and }$$

$$\begin{cases} I_{res+}(n) = \sqrt{\dfrac{1}{W} \sum_{k=n-(W-1)}^{n} i^2_{res+}(k)} \\ I_{res-}(n) = \sqrt{\dfrac{1}{W} \sum_{k=n-(W-1)}^{n} i^2_{res-}(k)} \\ I_{res}(n) = \sqrt{\dfrac{1}{W} \sum_{k=n-(W-1)}^{n} i^2_{res}(k)} \end{cases},$$

perform root-mean-square functional transformation to obtain the differential current $i_{diff}$ and the restraint current, wherein n or k indicates a sampling sequence number, and w is a data window length.

16. The relay protection device according to claim 10, wherein the differential protection unit is configured to:
achieve differential protection according to the differential current and the restraint current based on line ratio restraint characteristics or variable-slope ratio restraint characteristics.

17. The relay protection device according to claim 10, wherein the rectifier unit is configured to:
use digital rectification, to obtain an incomer-side input current and an outgoer-side output current which are equivalent according to $$\begin{cases} i_{N+}(n) = i_{Na+}(n) + i_{Nb+}(n) + i_{Nc+}(n) \\ i_{N-}(n) = i_{Na-}(n) + i_{Nb-}(n) + i_{Nc-}(n) \end{cases} \text{ and }$$

$$\begin{cases} i_{M+}(n) = i_{Ma+}(n) + i_{Mb+}(n) + i_{Mc+}(n) \\ i_{M-}(n) = i_{Ma-}(n) + i_{Mb-}(n) + i_{Mc-}(n) \end{cases},$$

wherein $$i_{kj+}(n) = \begin{cases} i_{kj}(n), & \text{if } i_{kj}(n) \geq 0 \\ 0, & \text{if } i_{kj}(n) < 0 \end{cases} \quad j = a, b, c; \quad k = N, M;$$

$$i_{kj-}(n) = \begin{cases} 0, & \text{if } i_{kj}(n) > 0 \\ |i_{kj}(n)|, & \text{if } i_{kj}(n) \leq 0 \end{cases} \quad j = a, b, c; \quad k = N, M.$$

and
the sign n indicates a sampling sequence number.

* * * * *